US 6,671,299 B2

(12) United States Patent
Suda

(10) Patent No.: US 6,671,299 B2
(45) Date of Patent: Dec. 30, 2003

(54) LASER POWER CONTROL CIRCUIT AND LASER SCANNER

(75) Inventor: Tadaaki Suda, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/011,406

(22) Filed: Dec. 11, 2001

(65) Prior Publication Data

US 2002/0075917 A1 Jun. 20, 2002

(30) Foreign Application Priority Data

Dec. 14, 2000 (JP) ..................................... P2000-379802

(51) Int. Cl.⁷ ................................................ H01S 3/00
(52) U.S. Cl. .................. 372/38.01; 372/29.01
(58) Field of Search ................ 372/29, 38.01; 256/234; 347/246

(56) References Cited

U.S. PATENT DOCUMENTS

| | | | |
|---|---|---|---|
| 5,648,949 A | * | 7/1997 | Miyamoto et al. ........ 369/59.18 |
| 5,859,659 A | | 1/1999 | Araki et al. |
| 5,903,378 A | * | 5/1999 | Takano et al. .............. 359/201 |
| 6,005,243 A | * | 12/1999 | Yamazaki .................... 250/234 |
| 6,078,347 A | * | 6/2000 | Nukui ......................... 347/246 |
| 6,164,540 A | * | 12/2000 | Bridgelall et al. ...... 235/462.01 |
| 6,324,197 B1 | * | 11/2001 | Suda ....................... 372/38.01 |
| 6,344,644 B1 | | 2/2002 | Minakuchi |

* cited by examiner

Primary Examiner—Paul Ip
Assistant Examiner—Hung T Vy
(74) Attorney, Agent, or Firm—Greenblum & Bernstein, P.L.C.

(57) ABSTRACT

A laser power control circuit utilized in a laser scanner that comprises lasers for forming latent images on a photosensitive drum is provided. The laser power control circuit controls the laser emitting power of a multi-laser diode which has two laser diodes and one photo diode for monitoring the laser power. The photo diode simultaneously receives laser beams emitted from each of the laser diodes and outputs an output signal in response to the received laser power. The laser power control processor alternately controls the laser emitting power of each of the laser diodes for each time period which is assigned to each of the lasers. The laser emitting power of the laser diodes is controlled in accordance with the output signal from the photo diode.

9 Claims, 7 Drawing Sheets

LASER POWER CONTROL CIRCUIT AND LASER SCANNER

BACKGROUND OF THE INVENTION

1. Field of the Invention

The present invention relates to a multi-beam laser scanner that comprises a plurality of lasers. In particular, the invention relates to a multi-beam laser scanner that further comprises an automatic power control (APC) system which automatically controls the power of the laser.

2. Description of the Related Art

A plurality of laser diodes in the multi-beam laser scanner are arrayed in the sub (vertical) scanning direction, so that a plurality of lines can be simultaneously scanned while the main (horizontal) scanning is carried out. Therefore, the multi-beam laser scanner has the advantage of swift scanning. In general, the laser scanner is provided with an APC circuit in order to maintain stable gray levels of the patterns to be formed, since the gray levels of patterns are affected by deterioration or fluctuation of the light emitted from the laser diode. The APC circuit controls the emission power of the laser diode by feeding back signals from a photo diode that monitors light emission from the laser diode. For a multi-beam laser scanner provided with the APC circuit, the automatic power control operation (APC) should be performed for each individual laser diode.

In recent years, a photo diode integrated laser diode, in which a laser diode and a photo diode are integrated in a package, and a multi-laser diode, in which a plurality of laser diodes and a single or a plurality of photo diodes are integrated, have been provided.

However, in general, the number of photo diodes in the multi-laser diode is less than the number of laser diodes mounted in a multi-laser diode, hence the photo diodes in the multi-laser diode cannot detect the beams from each of the laser diodes independently. Therefore, for monitoring the laser power of each laser diode independently, a plurality of photo diodes and light guide structures are necessarily provided external to the multi-laser diode and the built-in photo diodes of the multi-laser diode are not used. Consequently, the scanning apparatus with the multi-laser diode requires intricate structures.

SUMMARY OF THE INVENTION

An object of the present invention is to provide a multi-beam laser scanner in which real-time automatic power control is individually available for each laser by using a photo diode which monitors the plurality of lasers.

According to the present invention, a laser power control circuit utilized in a laser scanner that comprises a plurality of lasers for forming a latent image on a photosensitive member by scanning the plurality of lasers is provided. The laser power control circuit comprises a photo-detecting member and a laser power control processor.

The photo-detecting member simultaneously receives laser beams emitted from each of the lasers and outputs an output signal in response to the received laser power. The laser power control processor controls the laser emitting power of each laser for each time period which is assigned to each of the lasers. Further the laser emitting power is controlled in accordance with the output signal from the photo-detecting member.

According to the present invention, a laser scanner is provided that comprises a photosensitive member, a laser power control circuit a photo-detecting member and a laser power control processor.

The photosensitive member is for forming a latent image. The laser power control circuit comprises a plurality of lasers for forming the latent image on the photosensitive member by scanning the plurality of lasers. The photo-detecting member simultaneously receives laser beams emitted from each of the lasers and outputs an output signal which responds to received laser power. The laser power control processor controls the laser emitting power of each laser for each time period which is assigned to each laser. The laser emitting power is controlled in accordance with the output signal from the photo-detecting member.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
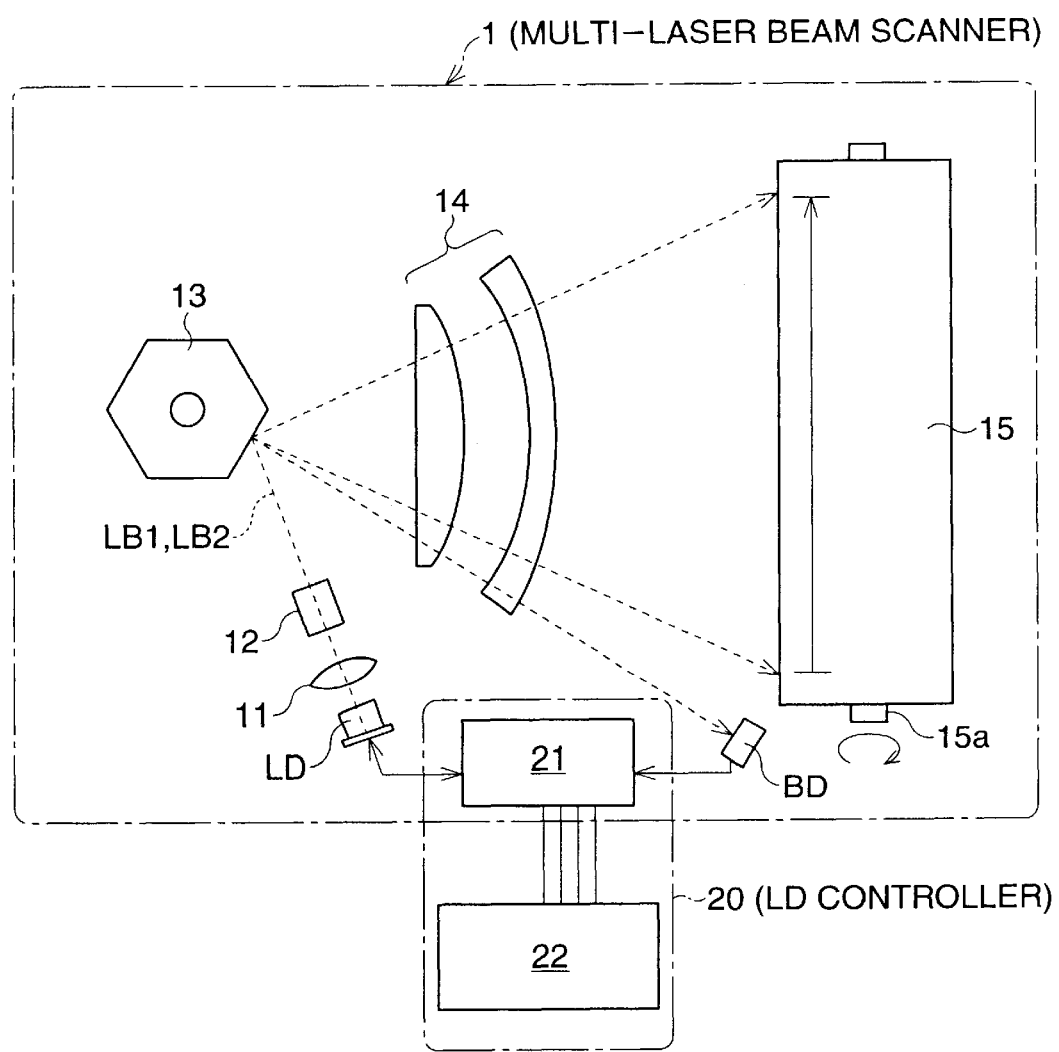
FIG. 1 schematically illustrates the structure of a multi-beam laser scanner to which the embodiments of the present invention are applied.

The present invention is described below with reference to the embodiments shown in the drawings.

FIG. 1 schematically illustrates a general construction of a laser scanner of an embodiment to which the present invention is applied. The laser scanner 1 is provided with a multi-laser diode unit LD which comprises a pair of lasers for image forming exposure. As will be discussed later, a first laser diode LD1, a second laser diode LD2, and a photo diode (photo-detecting member) PD for monitoring both the first and second laser diode LD1 and LD2 are integrally built into the multi-laser diode unit LD. A first and second laser beam LB1 and LB2 which are emitted from each of the laser diodes LD1 and LD2, are both collimated by a collimator lens 11 and pass through a cylindrical lens 12, and are then projected to a polygon mirror 13 which is revolved at high speed. The laser beams LB1 and LB2 are then reflected toward the direction of the main (horizontal) scanning by a reflecting mirror of the polygon mirror 13, and the main scanning at a photosensitive surface of a photosensitive drum 15 is carried out via an fθ lens 14. The photosensitive drum 15 has the rotating axis 15a which is parallel with the main scanning direction. The drum is rotated around the rotating axis 15a, so that the photosensitive drum 15 is sub scanned or vertically scanned by the laser beams LB1 and LB2, and a required pattern is formed on the drum surface. Further, a photo diode BD for detecting the timing of the laser scanning is disposed at a side of the photosensitive drum 15. The photo diode BD detects the laser beams LB1 and LB2 and synchronously outputs a synchronizing signal for the main scanning, in other words a horizontal synchronizing signal HSYNC. Further, a laser controller 20, which comprises an APC circuit, is connected to the multi-laser diode unit LD, so that the power of the light emitted at the multi-laser diode unit LD is controlled by the laser controller.

Figure 2:
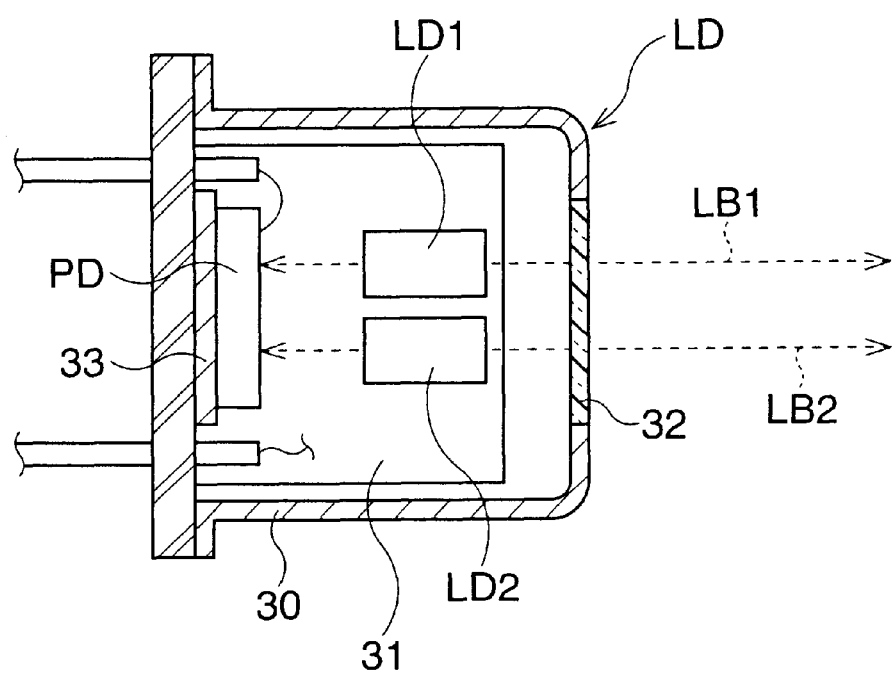
FIG. 2 schematically illustrates a sectional view of a multi-laser diode.

An example of the construction of the multi-laser diode unit LD is schematically shown in FIG. 2. For a typical example of a light emitting device, the first and second laser diodes LD1 and LD2, which may be comprised of semiconductor laser chips, are mounted on a mount-plate 31 that is provided in a hermetic package 30. The laser beams LB1 and LB2 output from the front distal ends of the respective first and second laser diodes LD1 and LD2 are both emitted to the outside through a glass window 32. Further, the single photo diode PD is mounted on a base-plate 33 which is disposed on the backside of the laser diodes LD1 and LD2. This single photo diode is an example of a light receiving device utilized for monitoring the laser diodes. Namely, the photo diode PD receives laser beams emitted from the rear distal ends of both the first and second laser diodes LD1 and LD2, so that the light emission power of both the first and second laser diodes LD1 and LD2 is monitored by the photo diode PD.

Figure 3:
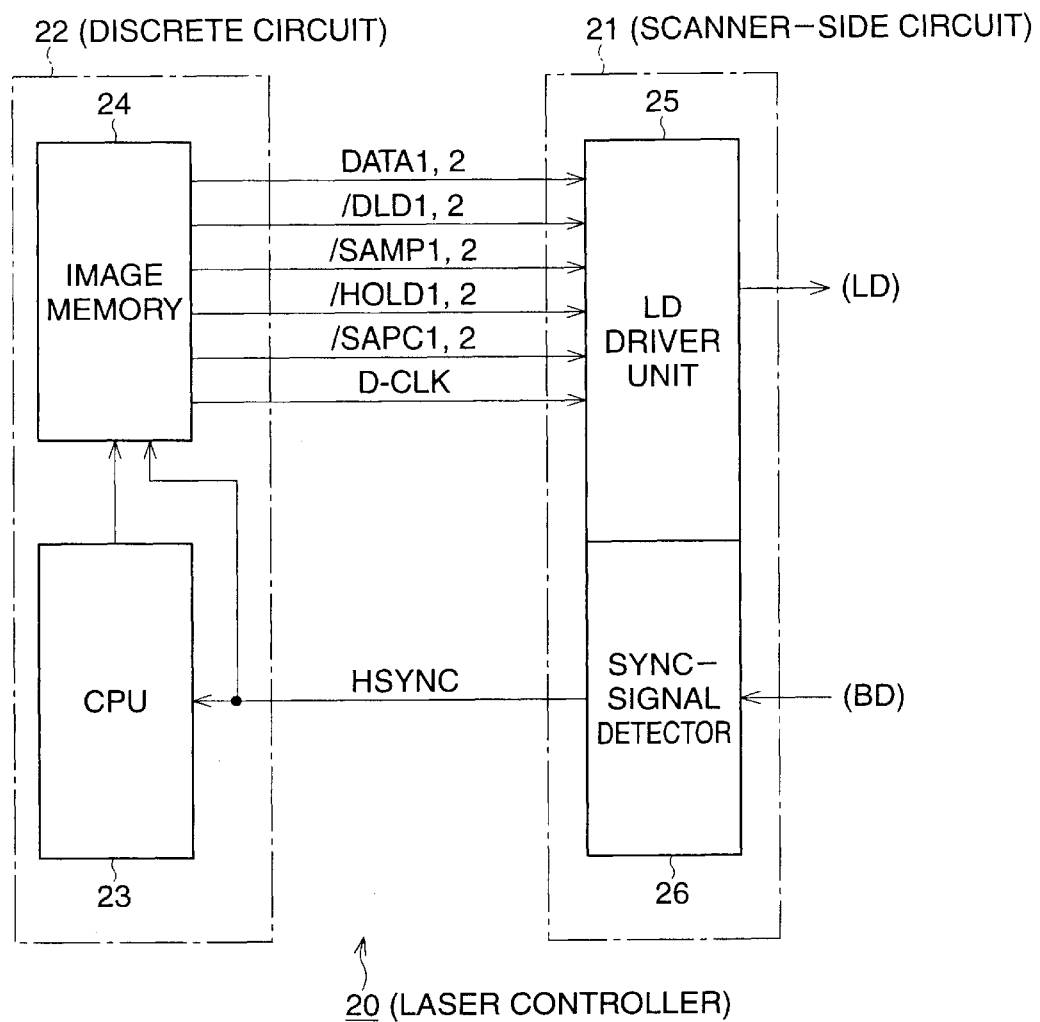
FIG. 3 is an electrical block diagram of a laser controller of an embodiment to which the present invention is applied.

FIG. 3 is a block diagram of the electrical construction of the laser controller 20. The laser controller 20 is comprised of a scanner-side circuit 21 and a discrete circuit 22. The scanner-side circuit 21 is integrated with the laser scanner 1 while the discrete circuit 22 is arranged separate from the laser scanner 1. The scanner-side circuit 21 and the discrete circuit 22 are mutually electrically connected. The discrete circuit 22 has a CPU 23 for various control calculations, and an image memory 24, which stores image data for an image or pattern to be produced. The scanner-side circuit 21 comprises an LD driver unit 25 and a sync-signal detector 26. The LD driver unit 25 is for driving the multi-laser diode LD and the sync-signal detector 26 is for detecting the timing of the laser scanning and generating the horizontal synchronizing signals HSYNC in accordance with signals fed from the photo diode BD. The horizontal synchronizing signals HSYNC are fed to both the CPU 23 and the image memory 24 from the sync-signal detector 26. From the image memory 24, a dot clock signal D-CLK which determines a dot pitch of an image, first image data DATA1 for the first laser diode LD1, and second image data DATA2 for the second laser diode LD2, are fed to the LD driver unit 25. Further, LD driving signals /DLD1 and /DLD2, level sample signals /SAMP1 and /SAMP2, hold signals /HOLD1 and /HOLD2, and APC timing signals /SAPC1 and /SAPC2 are fed from the image memory 24 to the APC circuit, which will be discussed later, in the LD driver unit 25. The LD driving signals /DLD1 and /DLD2 are the signals for driving and controlling the respective first and second laser diodes LD1 and LD2. The level sample signals /SAMP1 and /SAMP2 are for emitting sample laser beams for sampling the levels of laser emitting power of each first and second laser diode LD1 and LD2. The hold signals /HOLD1 and /HOLD2 control the timing for holding the sampling signals for evaluating the laser emitting power levels, and the APC timing signals /SAPC1 and /SAPC2 control the APC timing at the APC circuits. Note that, the slash, "/", which is a prefix to each of the above signals' name denotes active low signals of which the L (low) level corresponds to the active state.

Figure 4:
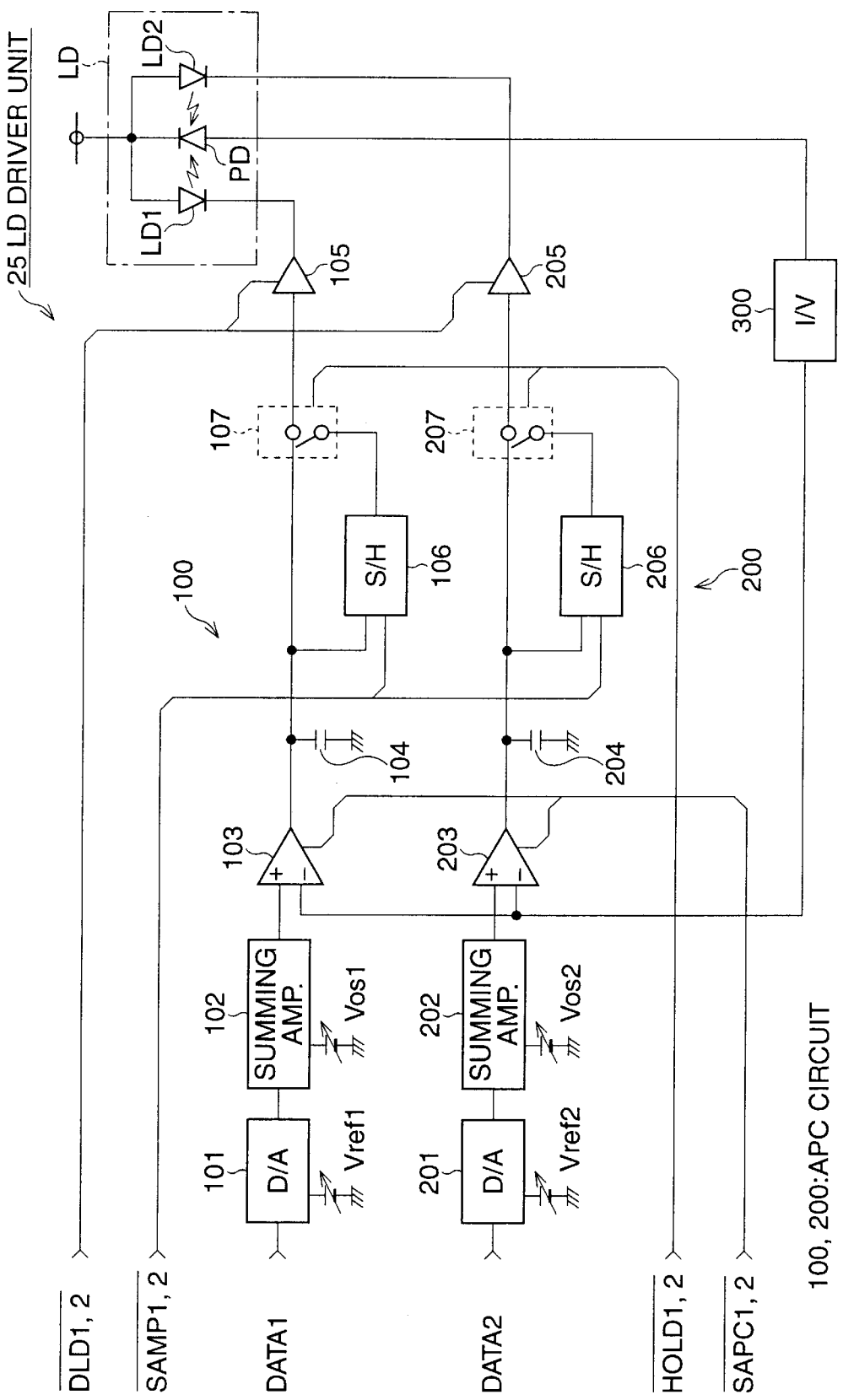
FIG. 4 is an electric schematic of the LD driver unit as shown in FIG. 3.

FIG. 4 is the electric schematic of the LD driver unit 25. First and second APC circuits 100 and 200, which correspond to the first and second laser diodes LD1 and LD2, are arranged in the circuit, so that real-time APC can be carried out in accordance with the output signals from the photodiode PD, which is used for monitoring the laser emitting power of the laser diodes LD1 and LD2 as shown in FIG. 2. The first APC circuit 100 is comprised of a first D/A converter 101, a first summing amplifier 102, a first comparator 103, a first capacitor 104, a first laser driver 105, a first S/H (sample-and-hold) circuit 106, and a first switch 107. The first D/A converter 101 converts the digital signals of the first image data DATA1, which are output from the image memory 24, as analog image signals. A predetermined base voltage is added to the analog image signals at the first summing amplifier 102. The output signals from the first summing amplifier 102 and the photo diode PD are compared at the first comparator 103 and then the first capacitor 104 charges the output from the comparator 103. The first laser driver 105 drives the laser beam emission of the first laser diode LD1 at a voltage held in the capacitor 104, which will be referred to as the LD driving voltage from here on. The first S/H circuit 106 samples and holds the LD driving voltage which will be applied to the first laser driver 105. The input of the output from the first S/H circuit 106 to the first laser diode 105 is controlled by the first switch 107 which connects or disconnects the first S/H circuit 106 and the first laser driver 105.

The first D/A converter 101 refers to a first black standard voltage Vref1, so that a black level of the first image data DATA1, the level that corresponds to the voltage for the maximum laser emitting power of the first laser diode LD1, is defined from the maximum value of the first image data DATA1 and the first black standard voltage Vref1. Further, the first D/A converter outputs signals between the above black level and 0 V. The first summing amplifier 102 refers to a first white standard voltage Vos1, so that a white level (low level) of the first image data DATA1, the level that corresponds to the voltage for the minimum laser emitting power of the first laser diode LD1, is set by adding the first white standard voltage Vos1 to the signals (voltage) from the first D/A converter 101. As the result, the voltage of the output signals from the first summing amplifier 102 are controlled between the white level and black level depending on the levels of the first image data DATA1.

The structure and functions of the second APC circuit 200 are similar to those of the first APC circuit 100 discussed above. Namely, the second APC circuit 200 is comprised of a second D/A converter 201, a second summing amplifier 202, a second comparator 203, a second capacitor 204, a second laser driver 206, a second S/H circuit 207, and a second switch 208. Further, the second D/A converter 201 refers to a second black level voltage Vref2 and the second summing amplifier 202 refers to a second white standard voltage Vos2, so that the voltage of the output signals from the second summing amplifier 202 are controlled between the white level and black level depending on the levels of the second image data DATA2.

On the other hand, an I/V (current-to-voltage) converter 300 is connected to the photo diode PD, so that current signals which are generated in the photo diode PD by receiving the laser beams from the first and second laser diode LD1 and LD2 are converted to voltage signals. The output of the I/V converter 300 is fed to both first and second comparators 103 and 203. The first comparator 103 compares the voltage of the signals from the first summing amplifier 102 and the I/V converter 300 and outputs a voltage which corresponds to the difference between the signals from the first summing amplifier 102 and the I/V converter 300. Namely, the voltage which corresponds to the difference between the signals from the first summing amplifier 102 and the I/V converter 300 is applied to the first capacitor 104, so that the above voltage at the output terminal of the first comparator 103 is held by the first capacitor 104. Further, the second comparator 203 compares the voltage of the signals from the second summing amplifier 202 and the I/V converter 300 and outputs a voltage which corresponds to the difference between the signals from the second summing amplifier 202 and the I/V converter 300. Namely, the voltage which corresponds to the difference between the signals from the second summing amplifier 202 and the I/V converter 300 is applied to the second capacitor 204, so that the above voltage at the output terminal of the second comparator 203 is held by the second capacitor 204.

Furthermore, the first and second comparators 103, 203 are also controlled by the APC timing signals /SAPC1 and /SAPC2, the first and second S/H circuits 106 and 206 are controlled by the sample signals /SAMP1 and /SAMP2, the first and second switches 107 and 207 are controlled by the hold signals /HOLD1 and /HOLD2 and the first and second laser drivers 105 and 205 are controlled by the LD driving signals /DLD1 and /DLD2, respectively.

The black level and the white level of both the first and second laser diodes LD1 and LD2 are set prior to the real-time APC execution of the first and second laser diodes LD1 and LD2 in the LD drive unit 25. At the beginning of the white level and the black level setting for the first laser diode LD1 of the first APC circuit 100, the LD driving signals /DLD1 and /DLD2 are set to the low level to activate the laser emission of the first laser diode LD1, and the hold signal /HOLD1 and the APC timing signal /SAPC1 are set to the non-active state and active state, respectively. In the case of setting the white level of the first laser diode LD1, the first image data DATA1 is set to the minimum value and the laser emitting power of the first laser diode LD1 is set to the predetermined value by adjusting the first white standard voltage Vos1 of the first summing amplifier 102. For example, the predetermined value of the laser emitting power is fixed to a half or below half of the lowest level that can form a latent image on the photosensitive drum 15. Namely the laser emitting power is set to the photo-insensitive level of the photosensitive drum 15. On the other hand, when setting the black level of the first laser diode LD1, the first image data DATA1 is set to the maximum value, while the first laser diode LD1 is emitting a laser as in the case of the white level setting. Then, the laser emitting power of the first laser diode LD1 is set to the maximum level by adjusting the first black standard voltage Vref1 of the first D/A converter 101. As the result of setting the white and black levels, when the first image data DATA1 are input to the first D/A converter 101 from the image memory 24, voltage signals that correspond to each of the first image data DATA1 are output from the first summing amplifier 102 within the range between the white level voltage and black level voltage. The voltage signals from the first summing amplifier 102 are then applied to an input terminal of the first comparator 103. The above operations for setting the black and white levels for the first APC circuit 100 are similarly carried out in the second APC circuit 200, so that the black and white levels for the second APC circuit 200 are set as well.

Figure 5:
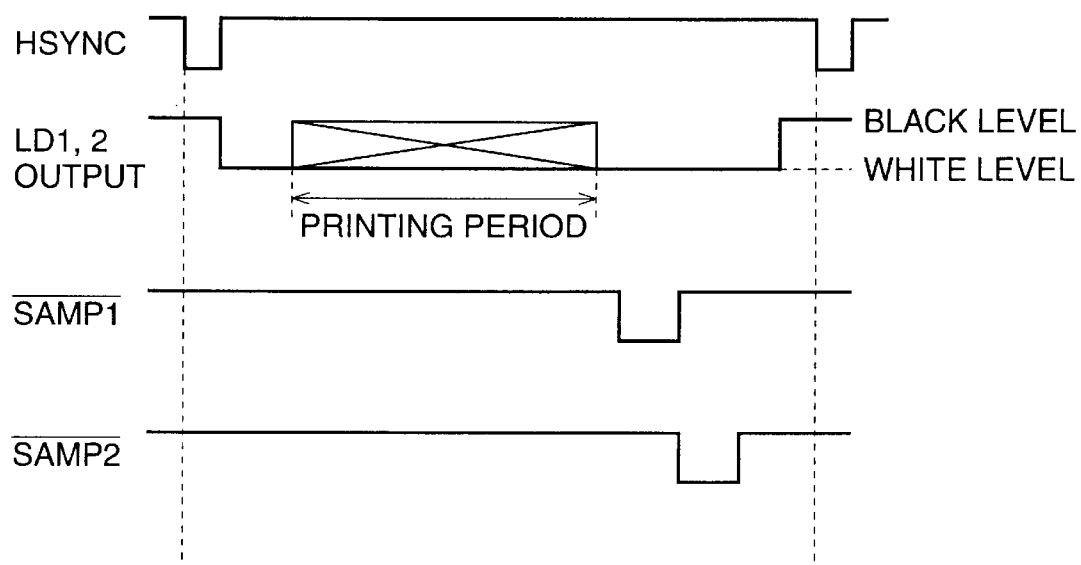
FIG. 5 is a timing chart showing the main scanning operation and the white and black level sampling operation in the laser scanner shown in FIG. 1.

Before the regular operation of the laser scanner 1, the white levels of each first and second laser diode LD1 and LD2 is sampled. The sampling operation for adjusting the white levels of the first and second laser diodes LD1 and LD2 will be explained with reference to FIG. 5. As shown in FIG. 5, the timing of the scanning operation is generally controlled by the main scanning synchronizing signal (horizontal synchronizing signal) HSYNC which is generated by the photo diode BD when the laser beams LB1 and LB2 from the laser diodes LD1 and LD2 are received by the photo diode BD at a predetermined timing that corresponds to the horizontal scanning period. A predetermined interval or period in the above horizontal scanning period is assigned to the printing for the photosensitive drum 15. During the period assigned to printing (printing period), the first and second laser diodes LD1 and LD2 emit laser beams LB1 and LB2 of which the power corresponds to the first and second image data DATA1 and DATA2 and which are between the black and white levels. In the marginal periods before and after the printing period (period for the printing area), the laser emitting power of the first and second laser diodes LD1 and LD2 is adjusted to the white level, i.e. the minimum laser emitting power, so as to keep or improve the response of the laser diodes or to reduce the thermal fluctuation of the laser diodes. For example, during a predetermined period (first sampling period) during the marginal period which follows the printing period, the laser emission of the second laser diode LD2 is interrupted while the first laser diode LD1 keeps emitting a laser beam at the white level and the sampling signal /SAMP1 is set to the low level, which activates signal sampling at the first S/H circuit 106. Namely, only the white level laser beam (LB1) from the first laser diode LD1 is received by the laser power monitoring photo diode PD and the current signal from the photodiode PD, which corresponds to the power of the received laser beam (LB1), is converted to the voltage signal by the I/V converter 300, so that the voltage which corresponds to the white level of the first laser diode LD1 is sampled by the first S/H circuit 106.

Similarly, during a predetermined period (second sampling period) in the marginal period which follows the printing period, the laser emission of the first laser diode LD1 is interrupted while the second laser diode LD2 keeps emitting a laser beam at the white level and the sampling signal /SAMP2 is set to the low level, which activates signal sampling at the second S/H circuit 206. Namely, only the white level laser beam (LB2) from the second laser diode LD2 is received by the laser power monitoring photo diode PD and the current signal from the photodiode PD, which corresponds to the power of the received laser beam (LB2), is converted to the voltage signal by the I/V converter 300, so that the voltage which corresponds to the white level of the second laser diode LD2 is sampled by the second S/H circuit 206.

The real-time APC operation is carried out after the completion of the above sampling operation for adjusting the white levels. For example, when the first image data DATA1 from the image memory 24 is fed to the first D/A converter 101, the voltage signal corresponding to the value of the first image data DATA1 is output from the first summing amplifier 102 to one side of the input terminal of the first comparator 103, within the voltage range between the white level and the black level. The other side of the input terminal of the first comparator 103 is connected to the I/V converter 300, which is connected to the laser power monitoring photo diode PD. The laser power monitoring photo diode PD generates the current which correlatively varies with the laser power or illumination sensed at the photo diode PD and feeds the current to the I/V converter 300. At the I/V converter 300, the current variation is converted to the voltage variation at a predetermined conversion rate and the varying voltage is applied to the input terminal of the first comparator 103, the terminal which is connected to the I/V converter 300. The first comparator 103 compares the potential levels of an input from the first summing amplifier 102 and an input from the I/V converter 300, wherein the former input corresponds to the first image data DATA1 and the latter to a standard or base voltage. The first comparator 103 produces an output signal that is a function of the result of the comparison, for example, a potential difference or voltage between the two inputs. The voltage of the output signal from the first comparator 103 is held by the first capacitor 104 and the voltage held by the first capacitor 104 is applied to the first laser driver 105 as the LD driving voltage, so that the first laser driver 105 supplies current that follows the above LD driving voltage to the first laser diode LD1 and the first laser diode LD1 emits a laser beam that is a function of the supplied current. Namely, the first laser diode LD1 emits the laser beam at the power corresponding to the values of the first image data DATA1, so that an image or pattern for the first image data DATA1 is formed on the photosensitive drum 15 and printed at a predetermined required density.

When the laser emitting power of the first laser diode LD1 is reduced due to some reason, such as temperature variation or so on, the output of the laser beam monitoring photo diode PD is also reduced in accordance with the reduction of the laser emitting power. Because of this, the difference between the two inputs to the first comparator 103 is enlarged and the voltage of the output signal from the first comparator 103 increases. As a result, the first capacitor 104 holds the increased voltage. Namely, the above LD driving voltage which corresponds to the voltage of the first capacitor 104 rises, thus the power of the first laser diode LD1 is increased by the first laser driver 105. Similarly, when the laser power of the first laser diode LD1 is increased, the power of the first laser diode LD1 is reduced by the first laser driver 105. Therefore, while a certain datum of the first image data DATA1 is input to the first APC circuit 100, the laser is emitting power of the first laser diode LD1 is stably maintained at a level that corresponds to the input datum, so that the real-time APC is achieved. In the same way, the real-time APC is also achieved at the second APC circuit.

In the embodiment of the present invention, the real-time APC for the first and second laser diodes LD1 and LD2 of the first and second APC circuits 100 and 200 is carried out by the single laser power monitoring photo diode PD. In the following, the operation of the real-time APC with the photo diode PD will be explained.

Figure 6:
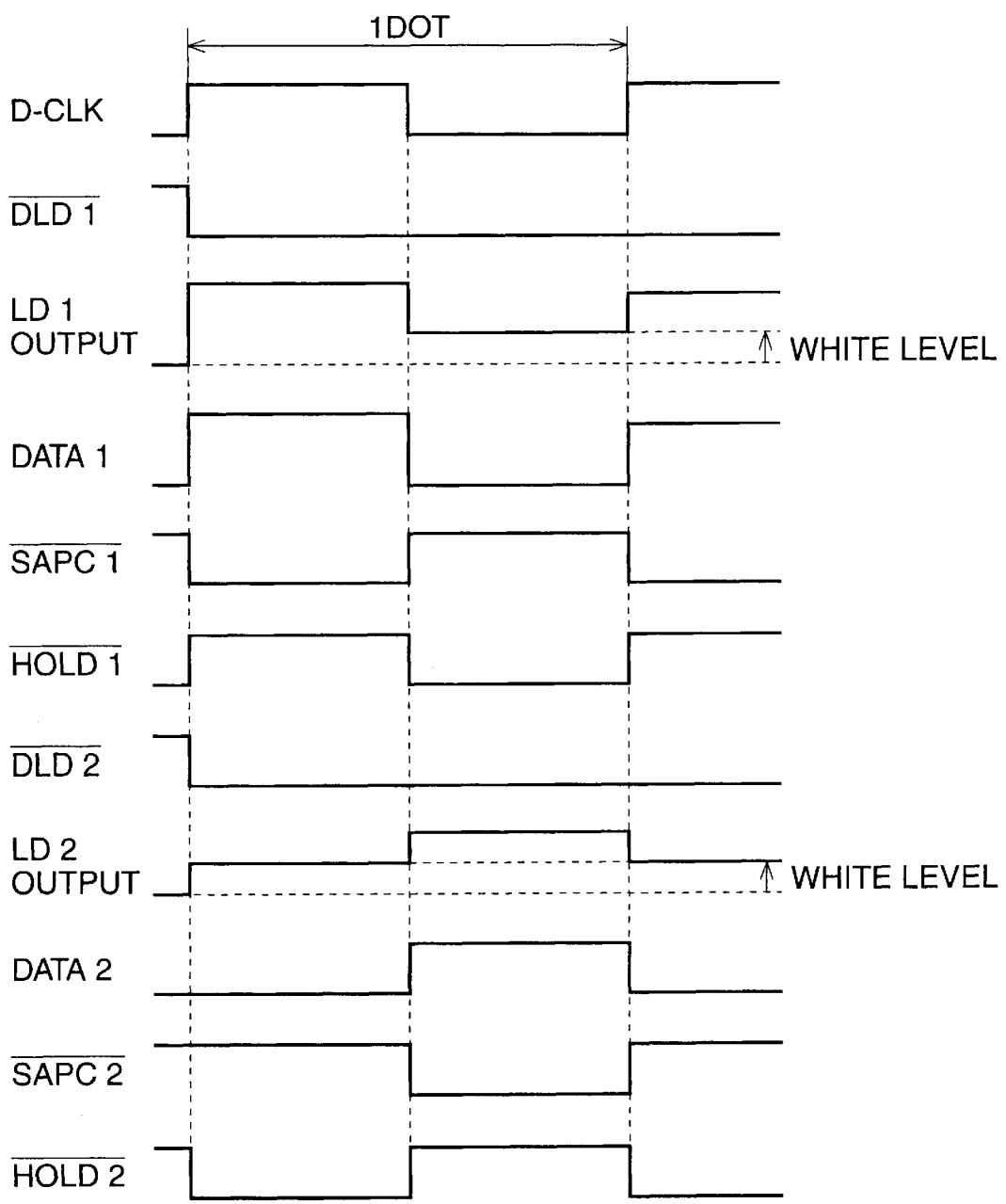
FIG. 6 is a timing chart showing an embodiment of the real-time APC operation to which the present invention is applied.

FIG. 6 is a timing chart showing the APC operation carried out in the first and second APC circuit 100 and 200. The dot clock signal D-CLK that determines a dot pitch of an image or pattern formed on the photosensitive drum 15 is fed from the image memory 24 arranged in the discrete circuit 22 to the LD driver unit 25 disposed in the scanner-side circuit 21. The period of the dot clock signal D-CLK is a time interval for scanning a dot that corresponds to a pixel in the main scanning for the photosensitive drum 15. The duty factor of the dot clock signal D-CLK is set to 50 percent. The real-time APC for the first laser diode LD1 of the first APC circuit 100 is carried out in the first half period of the dot clock signal D-CLK and the real-time APC for the second laser diode LD2 of the second APC circuit 200 is carried out in the second half period of the dot clock signal D-CLK.

While power is supplied to the laser scanner 1, the LD driving signals /DLD1 and /DLD2 for the first laser and the second laser diodes LD1 and LD2 are set to the active level (low level), so that the first and second diodes LD1 and LD2 keep emitting laser beams, irrespective of the phase of the dot clock signal D-CLK. During the first half period of the dot clock signal D-CLK, a datum of the first image data DATA1 from the image memory 24, a datum that corresponds to a single dot, is input to the first D/A converter 101. Namely, the input operation, which inputs the first image data DATA1 from the image memory 24 to the first D/A converter 101, is triggered by the rise in pulse for the first half period of the dot clock signal D-CLK. Consequently, the laser of which the power corresponds to the datum of the first image data DATA1 is emitted as to the above-described operation which is carried out with the first D/A converter 101, the first summing amplifier 102, the first comparator 103, the first capacitor 104, and the first laser driver 105. Further, during the first half period of the dot clock signal D-CLK, the APC timing signal /SAPC1 is set to the active level (or low level), so that the real-time APC is executed by comparing the voltage of the signals from the first summing amplifier 102 and the I/V converter 300, at the first comparator 103, as described before.

On the other hand, while the real-time APC for the first laser diode LD1 is executed, the zero level signal is input to the second D/A converter 201 as the datum of the second image data DATA2 so that the white level voltage is output from the second summing amplifier 202. At the same time, the APC timing signal /SAPC2 for the second comparator 203 is set to the non-active level (high level) and the hold signal /HOLD2 for the second S/H circuit 206 is set to the active level (low level). Namely, the second switch 207 is closed and the voltage that is held by the second S/H circuit 206 is applied to the second laser driver 205 via the second switch 207. As mentioned above, the LD driving voltage, which corresponds to the white level of the second laser diode LD2, was previously sampled and held in the second S/H circuit 206. Namely, during the first half period of the dot clock signal D-CLK, the white level voltage is applied to the second laser driver 205 through the second switch 207, so that a laser beam at the power of the white level is emitted from the second laser diode LD2.

During the second half period of the dot clock signal D-CLK, a datum of the second image data DATA2 from the image memory 24, a datum that corresponds to a single dot, is input to the second D/A converter 201. Namely, the input operation, which inputs the second image data DATA2 from the image memory 24 to the second D/A converter 201, is triggered by a rise in the pulse for the second half period of the dot clock signal D-CLK. Consequently, the laser of which the power corresponds to the datum of the second image data DATA2 is emitted according to the above-described operation which is carried out with the second D/A converter 201, the second summing amplifier 202, the second comparator 203, the second capacitor 204, and the second laser driver 205. Further, during the second half period of the dot clock signal D-CLK, the APC timing signal /SAPC2 is set to the active level (or low level), so that the real-time APC is executed by comparing the voltage of the signals from the second summing amplifier 202 and the I/V converter 300, at the second comparator 203, as described above.

On the other hand, while the real-time APC for the second laser diode LD2 is executed, the zero level signal is input to the first D/A converter 101 as the datum of the first image data DATA1 so that the white level voltage is output from the first summing amplifier 102. At the same time, the APC timing signal /SAPC1 for the first comparator 103 is set to the non-active level (high level) and the hold signal /HOLD1 for the first S/H circuit 106 is set to the active level (low level). Namely, the first switch 107 is closed and the voltage that is held by the first S/H circuit 106 is applied to the first laser driver 105 via the first switch 107. As mentioned above, the LD driving voltage, which corresponds to the white level of the second laser diode LD1, was previously sampled and held in the first S/H circuit 106. Namely, during the second half period of the dot clock signal D-CLK, the white level voltage is applied to the first laser driver 105 through the first switch 107, so that a laser beam at the power of the white level is emitted from the first laser diode LD1.

Therefore, in the first half period of the dot clock signal D-CLK, the real-time APC for the first laser diode LD1 is carried out in accordance with the first image data DATA1 and the laser emitting power of the second laser diode LD2 is maintained at the white level. On the other hand, in the second half period of the dot clock signal D-CLK, the real-time APC for the second laser diode LD2 is carried out in accordance with the second image data DATA2 and the laser emitting power of the first laser diode LD1 is maintained at the white level. Namely, at the APC circuit for which APC is not carried out, the hold signal (/HOLD1 or /HOLD2) is activated, i.e. set to the L level, in accordance with the dot clock signal D-CLK or the selection of the laser diode for which the APC is carried out, so that the output from the comparator (103 or 203) is ignored while the APC has not been carried out.

While the real-time APC for each of the first and second laser diodes LD1 and LD2 is being executed; the laser power monitoring photo diode PD receives the laser beams from both the first and second laser diodes LD1 and LD2. However, the power of the second laser diode LD2 is kept at the white level while the real-time APC is performed on the first laser diode LD1. Since the laser power of the white level for the second laser diode LD1 is set to half or below half of the lowest level required to produce a latent image on the photosensitive drum 15, a level which is minute compared to the laser power of the first laser diode LD1, and is held constant irrespective of the image data values, an effect of the laser beam from the second laser diode LD2 at the laser power monitoring photo diode PD can be neglected from the real-time APC for the first laser diode LD1. Similarly, the power of the first laser diode LD1 is kept at the white level while the real-time APC is performed on the second laser diode LD2. Since the laser power of the white level for the first laser diode LD1 is set to half or below half of the level required to produce a latent image on the photosensitive drum 15, a level which is minute compared to the laser power of the second laser diode LD1, and is held constant irrespective of the image data values, an effect of the laser beam from the first laser diode LD1 at the laser power monitoring photo diode PD can be neglected from the real-time APC for the second laser diode LD2. Consequently, the real-time APC can be precisely performed on both the first and second laser diodes LD1 and LD2.

Figure 7A:
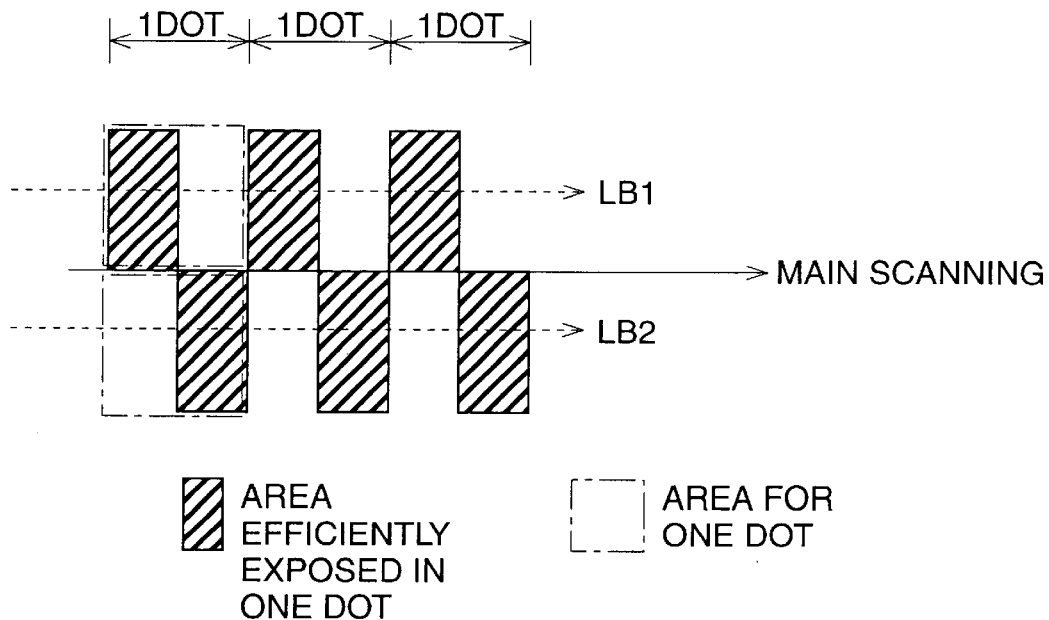
FIGS. 7A and 7B illustrate dot patterns formed by a scanner to which the present invention is applied.
Figure 7B:
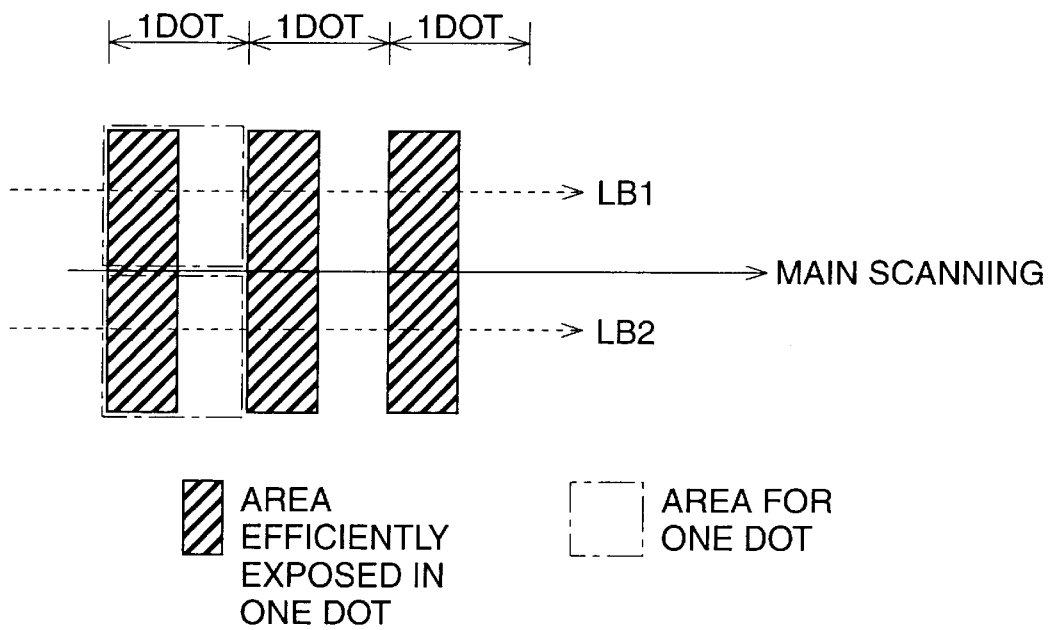

As described above, the real-time APC for the first and second laser diodes LD1 and LD2 are sequentially carried out in each of the first and second half periods of the dot clock signal D-CLK. Therefore, a pattern which is formed on the photosensitive drum 15 is represented by the pattern described in FIG. 7A. In the figure, the transverse direction corresponds to the main or horizontal scanning direction and the vertical direction corresponds to the sub or vertical scanning direction. The first laser beam LB1 of the first laser diode LD1 and the second laser beam LB2 of the second laser diode LD2 are aligned in the sub scanning direction (vertical direction) and the photosensitive drum 15 is exposed by the main scanning of both the first and second laser beams LB1 and LB2 in the horizontal direction. Since the first laser diode LD1 operates during the real-time APC, in the first half period of the dot clock signal D-CLK, the first laser beam LB1 effectively exposes the photosensitive drum 15, however the second laser beam LB2 ineffectively exposes the photosensitive drum 15 and produces no latent image, since the second laser diode LD2 is maintained at the white level. On the other hand, in the second half period of the dot clock signal D-CLK, the second laser diode LD2 is in the real-time APC, so that the second laser beam LB2 effectively exposes the photosensitive drum 15 and the first laser beam LB1 ineffectively exposes the photosensitive drum 15 to produce no latent image. As a result, although a dot or a pixel of an image on the photosensitive drum 15 is represented by an area indicated with the phantom line, in the present embodiment, only a half of the area, which is represented by the hatched area (FIGS. 7A and 7B) and which divides a dot into halves in the main scanning direction, is effectively exposed and a latent image is produced. However, in the development of the latent image, the size of a developed area for one dot generally exceeds the area effectively exposed in each one dot, since the development is affected by the size of toner particles. Therefore, in a substantial development, a dot or pixel area indicated with the phantom line in FIG. 7 will be filled with the toner. Therefore, the above ineffectively exposed area has only a small effect on the quality of the image. Note that, the present embodiment represents an example in which the horizontal positions of the optical axes of the first and second laser diodes LD1 and LD2 are the same, although the optical axis of the second laser diode LD2 may be shifted in the horizontal direction by a half dot from the position of the optical axis of the first laser diode LD1. In this case, the first and second laser beams LB1 and LB2 can effectively expose areas that are aligned on the horizontal line, as shown in FIG. 7B.

As described above, the real-time APC can be performed for both the first and second laser diodes LD1 and LD2, by a single laser-power-monitoring photo diode PD. This enables the real-time APC, even when using a multi-laser diode, of which the cost is comparatively low, to be utilized for the multi-beam system of the scanner. Further, the present embodiment does not require complicated electric connections as does a scanner which utilizes a plurality of photodiodes, so that the electric structure of the scanner is simplified and a scanner with the multi-beam system may be provided at low cost. Furthermore, by performing the real-time APC on a plurality of laser diodes with a single photo diode, real-time APC with uniform laser emission from the plurality of laser diodes is enabled.

In the present embodiment, a pair of laser diodes is discussed as an example of a multi-beam laser scanner to which the real-time APC with a single photo diode is applied, however, the present invention may similarly be applied to a multi-beam laser scanner which has three or more laser diodes. The real-time APC for n (n≧3) laser diodes can be obtained by partitioning the period of a dot clock signal D-CLK into n intervals. Although, in the present embodiment, the real-time APC was carried out with a single laser power monitoring photo diode, the present invention is not restricted to the real-time APC with a single photo diode. Namely, the invention may be applied to multi-beam systems with a plurality of laser-power-monitoring photo diodes of which the number is less than the number of laser diodes.

In the present embodiment, to provide the laser scanner with a simple structure and at a low cost, a multi-laser diode is used. However, the present invention may be applied to a scanner in which a photo diode for monitoring laser power is discretely provided for the laser diodes.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-379802 (filed on Dec. 14, 2000) which is expressly incorporated herein, by reference, in its entirety.

What is claimed is:

1. A laser power control circuit, utilized in a laser scanner that comprises a plurality of lasers for forming latent images on a photosensitive member by scanning said plurality of lasers, said laser power control circuit comprising:

a photo-detector that receives a plurality of laser beams emitted from said plurality of lasers and that outputs an output signal which responds to received laser power; and a laser power control processor that controls a laser emitting power of each of said lasers, for a time period assigned to each of said lasers, in accordance with the output signal from said photo-detector, wherein, for each of said lasers, said laser power control processor comprises:

a laser driving voltage generating processor that generates voltage to drive said laser;

a comparator that compares the driving voltage and the output signal from said photo-detector;

a holding processor that holds a predetermined voltage to drive said laser at a predetermined power level;

a laser driving processor that drives said laser in accordance with one of a comparator output signal from said comparator and a holding processor output signal from said holding processor; and a switch that alternatively connects one of said comparator and said holding processor to the laser driving processor;

wherein, when a first laser of said plurality of lasers is driven by the output signal from said comparator corresponding to the first laser, at least a second laser of said plurality of lasers is driven by a predetermined voltage corresponding to the second laser, and when the first laser is driven by a predetermined voltage corresponding to the first laser, the second laser is driven by the output signal from said comparator corresponding to the second laser.

2. A laser power control circuit according to claim 1, wherein said holding processor samples and holds the predetermined level of each of said lasers previous to an execution of said laser power control processor.

3. A laser power control circuit according to claim 1, wherein said first and second predetermined voltage correspond to a white level which is below a level necessary to produce a latent image on the photosensitive member.

4. A laser power control circuit according to claim 1, wherein said laser power control processor is synchronized with a dot clock signal, having a 50 percent duty factor, a period of said dot clock signal corresponding to a time needed to form an image dot on the photosensitive member, the first laser and the second laser being alternately controlled to form the image dot.

5. A laser power control circuit according to claim 1, wherein said plurality of lasers comprises a plurality of laser diodes and said photo-detector comprises at least one photo diode which simultaneously receives all of said laser beams from said plurality of laser diodes; wherein said plurality of laser diodes and said photo diode are integrated in one package.

6. A laser power control circuit utilized in a laser scanner, comprising at least a first laser diode and a second laser diode, that forms latent images on a photosensitive member, the laser power control circuit comprising:

a photo-detector that receives laser power from the first laser diode and the second laser diode, and outputs a signal indicating total received laser power; and a laser power control processor that controls a first laser emitting power of the first laser diode and a second laser emitting power of the second laser diode;

wherein, for a first predetermined time period, the laser power control processor controls the first laser emitting power to maintain a first predetermined low level and controls the second laser emitting power in accordance with the photo-detector output signal, and for a second predetermined time period, the laser power control processor controls the second laser emitting power to maintain a second predetermined low level and controls the first laser emitting power in accordance with the photo-detector output signal.

7. A laser power control circuit according to claim 6, wherein the first predetermined low level and the second predetermined low level are set to corresponding white levels, which are below a level necessary to produce a latent image on the photosensitive member.

8. A laser power control circuit according to claim 6, wherein said laser power control processor is synchronized with a dot clock signal that has a fifty percent duty factor and a period of the dot clock signal corresponds to a time to form an image dot, the laser power control processor alternately controlling the first laser and the second laser to form the image dot.

9. A laser power control circuit according to claim 6, wherein the photo-detector comprises at least one photo diode, the first laser diode, the second laser diode and the photo diode being physically integrated.

* * * * *